(12) United States Patent
Shebaita et al.

(10) Patent No.: US 11,520,962 B1
(45) Date of Patent: Dec. 6, 2022

(54) ACCURATELY CALCULATING MULTI-INPUT SWITCHING DELAY OF COMPLEMANTARY-METAL-OXIDE SEMICONDUCTOR GATES

(71) Applicant: Synopsys, Inc., Mountain View, CA (US)

(72) Inventors: Ahmed M. Shebaita, Fremont, CA (US); Han Y. Koh, Fremont, CA (US); Li Ding, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 387 days.

(21) Appl. No.: 16/699,285

(22) Filed: Nov. 29, 2019

Related U.S. Application Data

(60) Provisional application No. 62/773,521, filed on Nov. 30, 2018.

(51) Int. Cl.
| | |
|---|---|
| *G06F 30/3312* | (2020.01) |
| *G06F 119/12* | (2020.01) |
| *G06F 30/398* | (2020.01) |
| *H03K 19/0948* | (2006.01) |

(52) U.S. Cl.
CPC ........ *G06F 30/3312* (2020.01); *G06F 30/398* (2020.01); *H03K 19/0948* (2013.01); *G06F 2119/12* (2020.01)

(58) Field of Classification Search
CPC ............. H03K 19/0948; G06F 2119/12; G06F 30/3312; G06F 30/398; G06F 30/3315
USPC .......................... 703/19, 15–17; 716/108, 113
See application file for complete search history.

(56) References Cited

U.S. PATENT DOCUMENTS

| | | | | |
|---|---|---|---|---|
| 6,324,671 | B1* | 11/2001 | Ratzel ..................... | G06F 30/30 716/108 |
| 6,836,160 | B2* | 12/2004 | Li ........................... | G05F 3/265 327/513 |
| 7,562,323 | B1* | 7/2009 | Bai ...................... | G06F 30/3312 703/2 |
| 8,451,048 | B2* | 5/2013 | Zhang ...................... | G05F 3/30 327/513 |
| 8,643,520 | B1* | 2/2014 | Huo ....................... | H03M 1/068 341/144 |
| 8,719,752 | B1* | 5/2014 | Ye ............................ | G06F 30/36 716/112 |
| 9,129,078 | B1* | 9/2015 | Keller ................. | G06F 30/3312 |
| 9,245,071 | B2* | 1/2016 | Katz ................... | G06F 30/3312 |
| 9,465,899 | B2* | 10/2016 | Sundareswaran ..... | G06F 30/392 |

(Continued)

*Primary Examiner* — Juan C Ochoa
(74) *Attorney, Agent, or Firm* — Park, Vaughan, Fleming & Dowler LLP; Laxman Sahasrabuddhe

(57) ABSTRACT

Techniques and systems for determining an output waveform at an output of a complementary metal-oxide-semiconductor (CMOS) logic gate are described. Some embodiments can identify at least one set of inputs of the CMOS logic gate that, when switched together, causes multiple transistors coupled in parallel to simultaneously turn-on and drive the output of the CMOS logic gate. Next, the embodiments can determine a set of current source models that are coupled in parallel to model the CMOS logic gate when the set of inputs of the CMOS logic gate are switched together. The embodiments can then simulate the set of current source models together to determine the output waveform at the output of the CMOS logic gate when the set of inputs of the CMOS logic gate are switched together.

20 Claims, 7 Drawing Sheets

(56) References Cited

U.S. PATENT DOCUMENTS

| | | | |
|---|---|---|---|
| 9,692,361 B2* | 6/2017 | Blednov | H03F 1/0288 |
| 11,210,444 B1* | 12/2021 | Chang | G06F 30/3312 |
| 11,289,639 B2* | 3/2022 | Gilbert | H01L 39/143 |
| 11,349,522 B2* | 5/2022 | Kuroda | H04L 5/16 |
| 2017/0242949 A1* | 8/2017 | Schindler | G06F 30/367 |

* cited by examiner

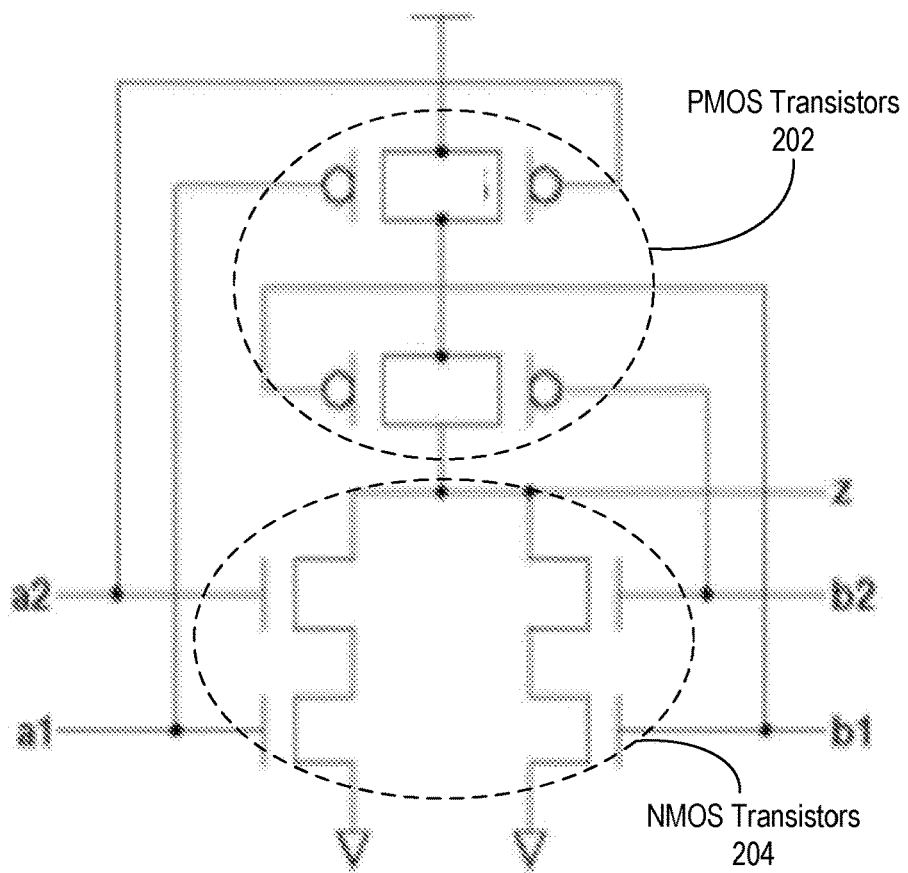

```
cell rise
a1->z, a1(fall): negative_unate, when=a2&!b1&!b2
    MIS pin set: (a1, a2)
a1->z, a1(fall): negative_unate, when=a2&!b1&b2
    MIS pin set: (a1, a2), b1 is in series with a1.
a1->z, a1(fall): negative_unate, when=a2&b1&!b2
    MIS pin set: (a1, a2), b2 is in series with a1.
```

```
cell fall
a1->z, a1(rise): negative_unate, when=a2&!b1&b2
    MIS pin set: (a1, b1)
a1->z, a1(rise): negative_unate, when=a1&b1&!b2
    MIS pin set: (a1, b2)
a1->z, a1(rise): negative_unate, when=a1&!b1&!b2
    MIS pin sets: (a1, b1), (a1, b2)
```

FIG. 2

ACCURATELY CALCULATING MULTI-INPUT SWITCHING DELAY OF COMPLEMANTARY-METAL-OXIDE SEMICONDUCTOR GATES

RELATED APPLICATION

This application claims benefit of U.S. Provisional Application Ser. No. 62/773,521, filed on 30 Nov. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to accurately calculating multi-input switching (MIS) delay of complementary metal-oxide-semiconductor (CMOS) gates.

Related Art

Advances in process technology have fueled a rapid increase in the size and complexity of IC designs. This dramatic increase in complexity and integration densities has made it considerably more challenging to design ICs.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques for determining an output waveform at an output of a CMOS logic gate.

Some embodiments can identify at least one set of inputs of the CMOS logic gate that, when switched together, causes multiple transistors coupled in parallel to simultaneously turn-on and drive the output of the CMOS logic gate. Next, the embodiments can determine a set of current source models that are coupled in parallel to model the CMOS logic gate when the set of inputs of the CMOS logic gate are switched together. In some embodiments, each current source model in the set of current source models can be a composite current source noise (CCS-N) model. The embodiments can then simulate the set of current source models together to determine the output waveform at the output of the CMOS logic gate when the set of inputs of the CMOS logic gate are switched together.

The CMOS logic gate can generally implement any arbitrary logic function. Specifically, in some embodiments, the CMOS logic gate implements the logic function "z= $((!a_1+!a_2+ \ldots +!a_m)*(!b_1+!b_2+ \ldots +!b_n))$," where z is the output, $a_i$, $1 \le i \le m$, $b_j$, $1 \le j \le n$, are inputs, exclamation points represent logical negation operations, the asterisk symbol represents a logical conjunction operation, and the plus symbols represent logical disjunction operations.

In some embodiments, simulating the set of current source models comprises temporally shifting input waveforms of the set of inputs to temporally align a peak driving current of the multiple transistors coupled in parallel. Specifically, in some embodiments, temporally shifting input waveforms of the set of inputs comprises temporally shifting input waveforms of each input in the set of inputs by a respective input-to-output arc delay specified in a non-linear delay model (NLDM) of the CMOS logic gate.

Some embodiments can use the output waveform at the output of the CMOS logic gate to determine a delay between a transition in the set of inputs of the CMOS logic gate and a corresponding transition in the output of the CMOS logic gate. In some embodiments, the determined delay is a minimum switching delay of the CMOS logic gate, and the embodiments can use the minimum switching delay of the CMOS logic gate during static timing analysis (STA) to determine a hold timing violation in an IC design that includes the CMOS logic gate.

BRIEF DESCRIPTION OF THE FIGURES

FIGS. 1-2 illustrate examples of MIS pin sets in accordance with some embodiments described herein.

DETAILED DESCRIPTION

Figure 1:
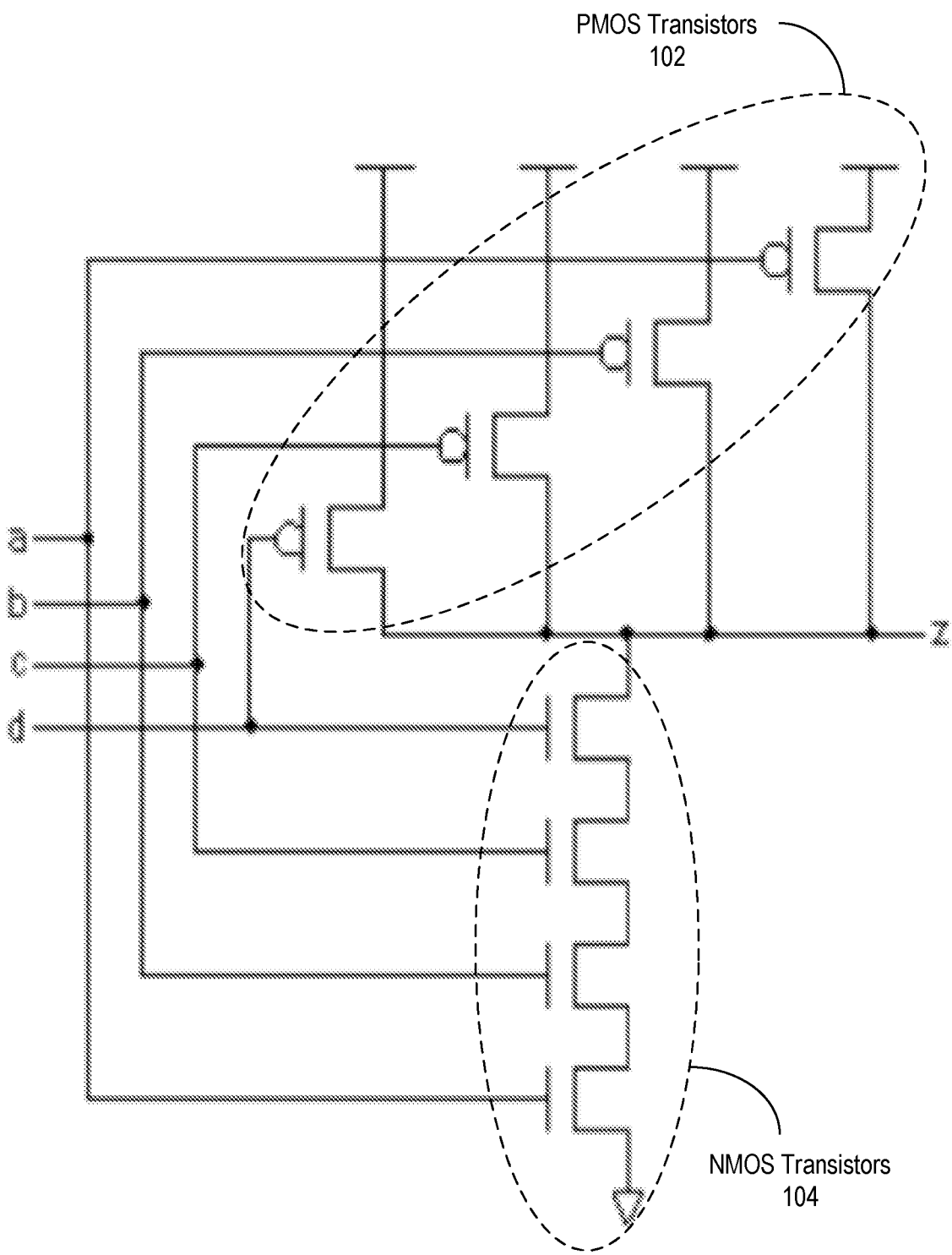

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

Existing STA tools assume single-input switching (SIS), and optionally add a single derating factor as an extra margin to account for potential MIS behavior. However, MIS impact is a function of input signal slews, load capacitance, and skews of the input waveforms. The single derating factor based solution is grossly inaccurate. On the other hand, a table-based method would be impractical because it requires pre-characterized multi-dimensional derate tables. Therefore, there is a need for accurately calculating the MIS delay of a CMOS logic gate without the above-mentioned drawbacks.

The delay of a gate can depend on a number of factors. For example, the delay can be different for different input/output terminal pairs. Further, delay can depend on the capacitive load on the output terminal and/or the slew of the input signal. Arrival times and required times are used to determine whether a design meets the timing requirements. The arrival time associated with a terminal of a logic gate indicates when a signal is expected to arrive at the terminal. The required time associated with the terminal indicates when the signal is required to arrive at the terminal. The slack associated with a terminal is the difference between the required time and the arrival time. Typically, the slack of a terminal is said to be violating if it is less than a predetermined threshold value.

There are at least two types of timing requirements that are used in STA: setup timing requirements and hold timing requirements. A setup timing requirement is violated when a signal arrives at a pin or terminal later than it is supposed to arrive. A hold timing requirement is violated if a signal does not remain stable for sufficiently long. Additional information on STA and timing requirements can be found in Luciano Lavagno (Editor), Louis Scheffer (Editor), Grant Martin (Editor), EDA for IC Implementation, Circuit Design, and Process Technology (Electronic Design Automation for Integrated Circuits Handbook), CRC Press, 1st Ed., March 2006, the contents of which are herein incorporated by reference in their entirety for all purposes.

The maximum delay of a gate is useful in determining whether or not a path in the IC design violates a setup timing requirement. The minimum delay of a gate is useful in determining whether or not a path in the IC design violates a hold timing requirement. Some embodiments described herein are directed to accurately calculate the minimum delay of a gate in the presence of MIS. In particular, some embodiments described herein feature techniques and systems for accurately capturing MIS behavior of an IC without using an explicit library characterization for MIS effects in order to improve the accuracy of calculated timing delay values (particularly, minimum delay values of the CMOS logic gate). Some embodiments described herein can be used for improving the accuracy of STA of integrated circuits, and in particular, the accuracy of timing delay values for evaluating hold timing requirements during STA.

Some embodiments described herein can begin by determining one or more MIS pin sets, wherein each MIS pin set defines a set of pins that, when switched together, change the driving strength of a logic gate. The embodiments then construct equivalent parallel current source models, e.g., CCS-N models, for pullup/pulldown networks in the CMOS logic gate using existing library data. Next, the embodiments can identify the worst-case alignment of input waveforms without performing iterative analyses (in which each iteration simulates a distinct alignment of input waveforms, and the iteration that produces the minimum delay is outputted as the worst-case alignment). Finally, the embodiments can simulate the constructed circuit (which comprises a parallel bank of current source models, e.g., CCS-N models), and capture the MIS response at the output (i.e., the output waveform at the output of the CMOS logic gate). The MIS response at the output can then be used to calculate the minimum delay for the CMOS logic gate.

Embodiments described herein can fully model the slew and load dependency of MIS effect, and have been shown to have near SPICE-level accuracy (SPICE stands for "Simulation Program with Integrated Circuit Emphasis" is a simulation environment that is considered by many to be the "golden standard" for simulating logic gates). The runtime overhead of the embodiments is very small. Since the embodiments only depend on existing libraries, the adoption barrier for production usage is also very low.

As mentioned above, the first step is to determine MIS pin sets. A MIS pin set is a set of pins that, when switched simultaneously (or nearly simultaneously), changes the driving strength of the CMOS logic gate. MIS pin sets preserve the original arc sense and the "when" condition of the non-switching pins.

FIGS. 1-2 illustrate examples of MIS pin sets in accordance with some embodiments described herein. The four-input CMOS NAND gate shown in FIG. 1 comprises PMOS transistors 102 and NMOS transistors 104. The NAND gate implements the logic function "z=!(a*b*c*d)," where the asterisk symbol "*" represents the logical AND operation, and the exclamation point "!" represents the logical NOT operation. When all four inputs ("a, b, c, d") transition from high-to-low (i.e., logic 1 to logic 0), the output ("z") transitions from low-to-high (i.e., logic 0 to logic 1).

In FIG. 1, when all four inputs "a," "b," "c," and "d" transition from high-to-low, all four PMOS transistors 102 are turned on at the same time, and the sum of the currents from all four PMOS transistors drives the output "z" from low-to-high. Because the output capacitive load is being charged by the sum of the four PMOS currents, the delay is expected to be significantly lower than the delay if only one of the four PMOS transistors had been turned on and was driving the output. This is the reason why the SIS delays does not accurately represent the minimum delay of the logic gate. Note that, in FIG. 1, the MIS pin set is (a, b, c, d) for the case when the output is rising. On the other hand, the MIS pin set is null for the case when the output is falling.

FIG. 2 illustrates a logic gate that comprises PMOS transistors 202 and NMOS transistors 204, and implements the logic function "z=((!a1+!a2)*(!b1+!b2))," where the plus symbol "+" represents the logical OR operation, and the other symbols have the same meaning as before. In FIG. 2, in the case when the output rises (i.e., transitions from low-to-high), there are three possibilities as shown in MIS pin sets 206. Likewise, for the case when the output falls (i.e., transitions from high-to-low), there are three possibilities as shown in MIS pin sets 208.

There are at least two complications that need to be addressed when a CCS-N model is created for calculating MIS delays. One complication is that the CCS-N model for each arc already takes the loading effect of the neighboring arcs into consideration. Hence, when the CCS-N models are constructed, care must be taken so as to not double-count the load. Another complication is that, unlike NAND gates as shown in FIG. 1, simultaneously switching arcs are not always fully parallel. In this case, equivalent parallel CCS-N models are constructed by identifying the augmenting arc of the simultaneously switching arcs. Specifically, in some embodiments, the equivalent CCS-N models are constructed by modifying the direct current (DC) current tables of the original models to match the current of the augmenting arc.

Figure 3:
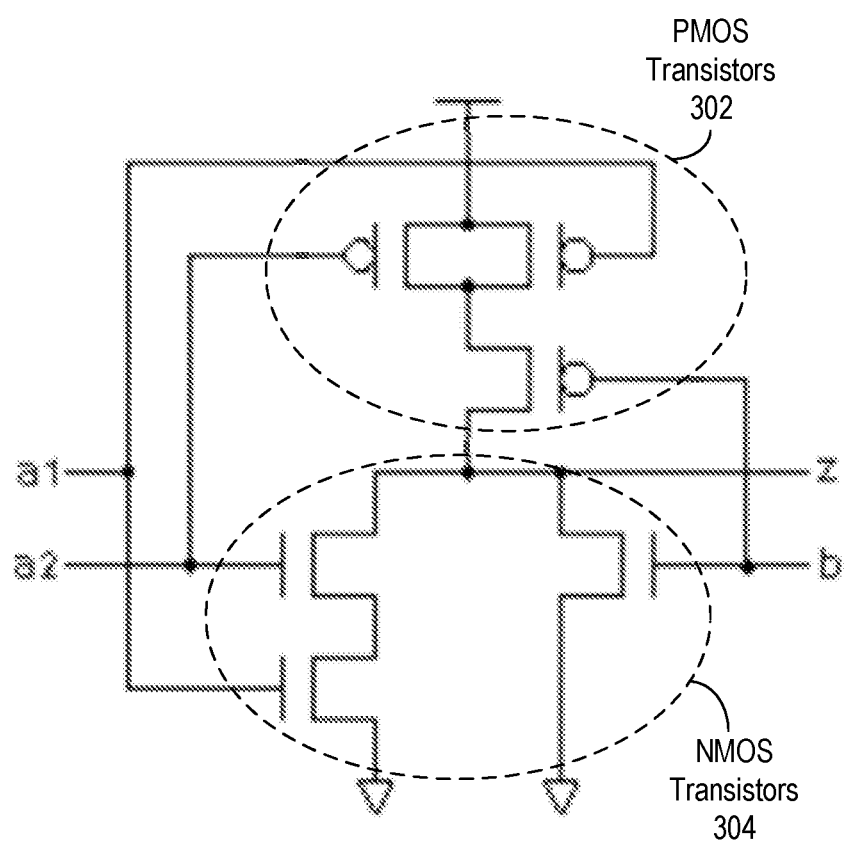
FIG. 3 illustrates a situation where simultaneously switching arcs are not always fully parallel in accordance with some embodiments described herein.

FIG. 3 illustrates a situation where simultaneously switching arcs are not always fully parallel in accordance with some embodiments described herein. The PMOS transistors 302 and NMOS transistors 304 shown in FIG. 3 implement the logic function "z=((!a1+!a2)*!b)." When the output is rising, the arcs a1→z (when a2&!b) and a2→z (when a1&!b) are not fully parallel. In such situations, equivalent parallel CCS-N models are constructed using the original arcs and the augmenting arc b→z (when !a1&!a2). The equivalent CCS-N models are constructed by modifying the DC current tables to match the current of the rising augmenting arc. Note that double counting of the load is also avoided in the newly constructed CCS-N models.

In general, finding an augmenting arc is not always straightforward. For a rising gate, the augmenting arc is one whose pull-up network has all conducting PMOS transistors. For a falling gate, it is one whose pull-down network has all conducting NMOS transistors.

Figure 4:
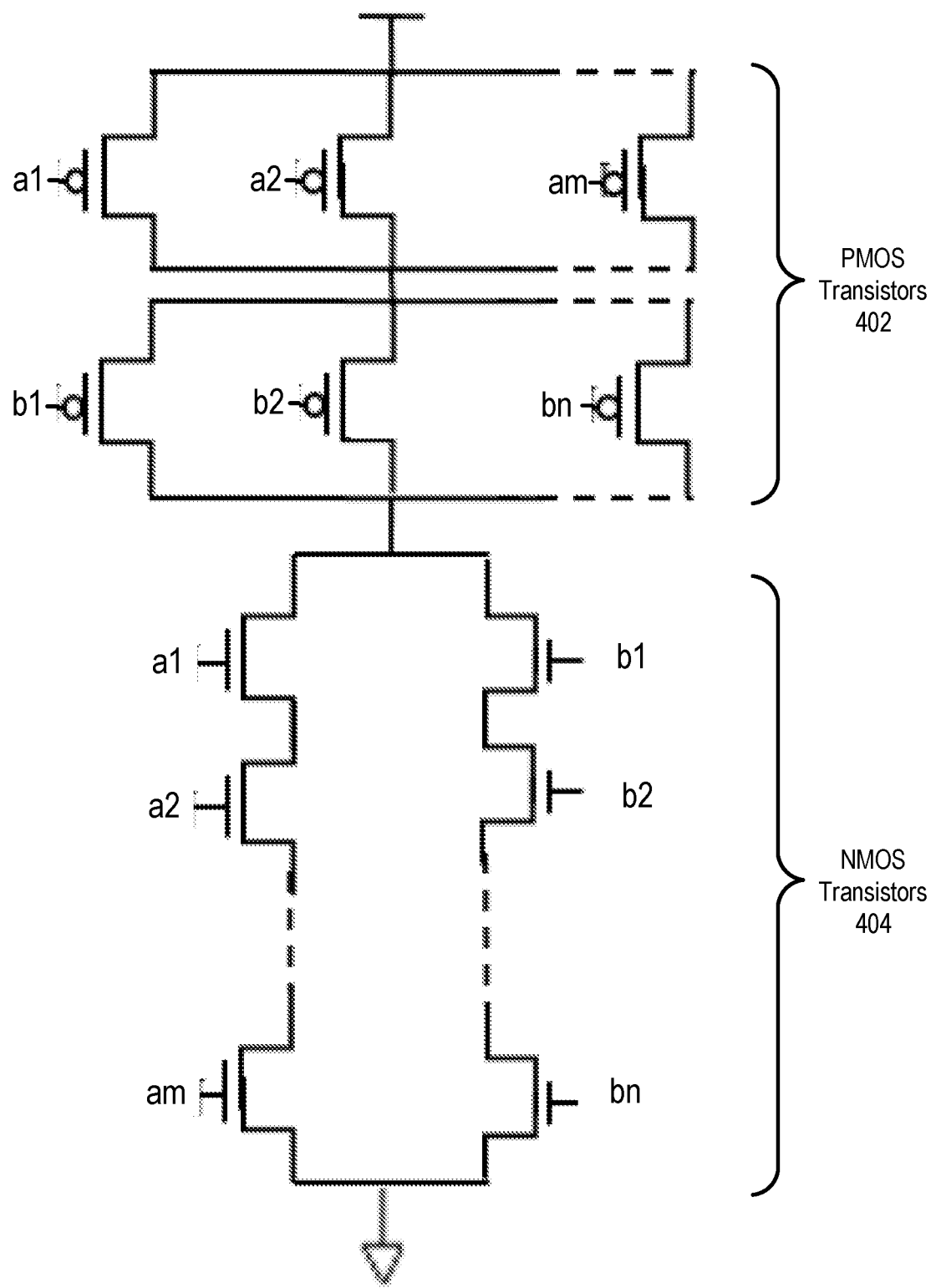
FIG. 4 illustrates a generic gate that combines logical AND, OR, and NOT operations in accordance with some embodiments described herein.

FIG. 4 illustrates a generic gate that combines logical AND, OR, and NOT operations in accordance with some embodiments described herein. PMOS transistors 402 and NMOS transistors 404 in FIG. 4 implement the logic function "z=((!a1+!a2+ . . . +!am)*(!b1+!b2+ . . . +!bn))."

In FIG. 4, the current of an augmenting arc is given by:

$$I_{aug} = \frac{V_{dd}}{R_{aug}},$$

where $$R_{aug} = \frac{1}{\sum_{i=1}^{m} 1/r_{ai}} + \frac{1}{\sum_{i=1}^{n} 1/r_{bi}}.$$

The resistances $r_{a1}, r_{a2}, \ldots, r_{am}$, and $r_{b1}, r_{b2}, \ldots, r_{bn}$ are the resistances of the PMOS transistors between their respective source and drain terminals when the transistor is in the "on" state, with the subscript identifying the transistor based on the input. For example, resistance "$r_{a1}$" is the on-state source-to-drain resistance of the PMOS transistor that receives the logic input "a1," resistance "$r_{a2}$" is the on-state source-to-drain resistance of the PMOS transistor that receives the logic input "a2," and so forth.

The resistance values $r_{a1}, r_{a2}, \ldots, r_{am}$, and $r_{b1}, r_{b2}, \ldots, r_{bn}$ can be computed by solving the following simultaneous equations:

$$\forall_{k=1:m, h=1:n} \; r_{ak} + r_{bh} + \ldots = \frac{V_{dd}}{I_{ak(when \; !b_h \& \forall_{i \neq h} b_i \& \forall_{j \neq k} a_j)}}.$$

Once the current of the augmenting arc, $I_{aug}$, is computed, the equivalent CCS-N models can be constructed by modifying the DC current tables of the original models. At this point, a circuit comprising a set of CCS-N models has been constructed. However, to compute the worst-case (i.e., fastest) multi-input switching delay, an additional step is performed prior to simulation: determining a proper alignment of the input waveforms. (Recall that the "worst-case" switching delay of a logic gate for hold timing requirements is the minimum switching delay of the logic gate.)

Figure 5A:
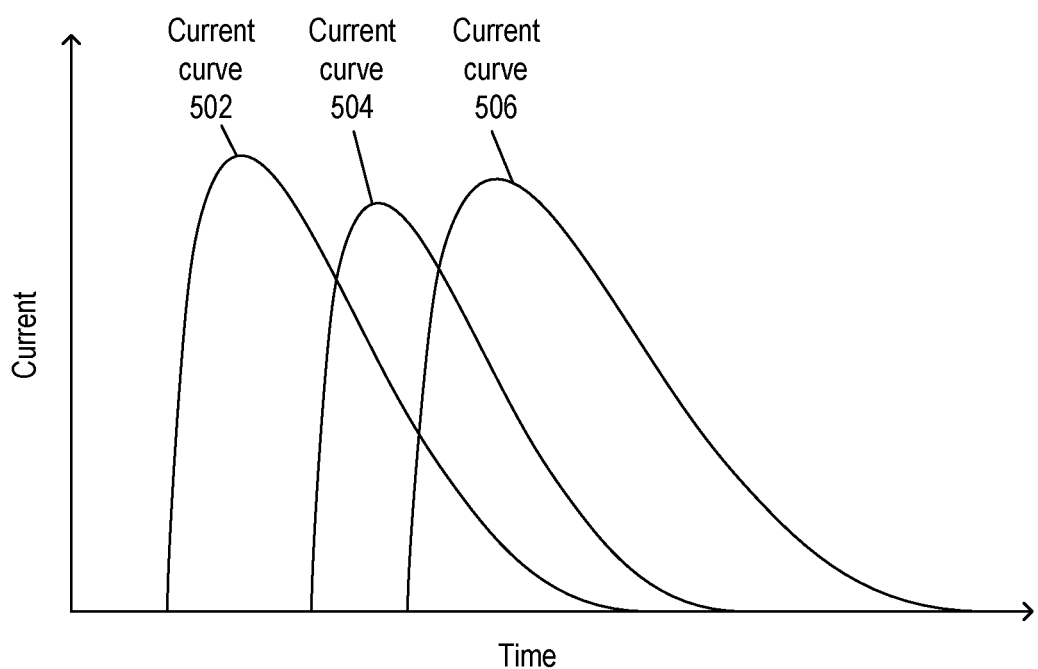
FIGS. 5A-5B illustrate how current curves can be aligned in accordance with some embodiments described herein.
Figure 5B:
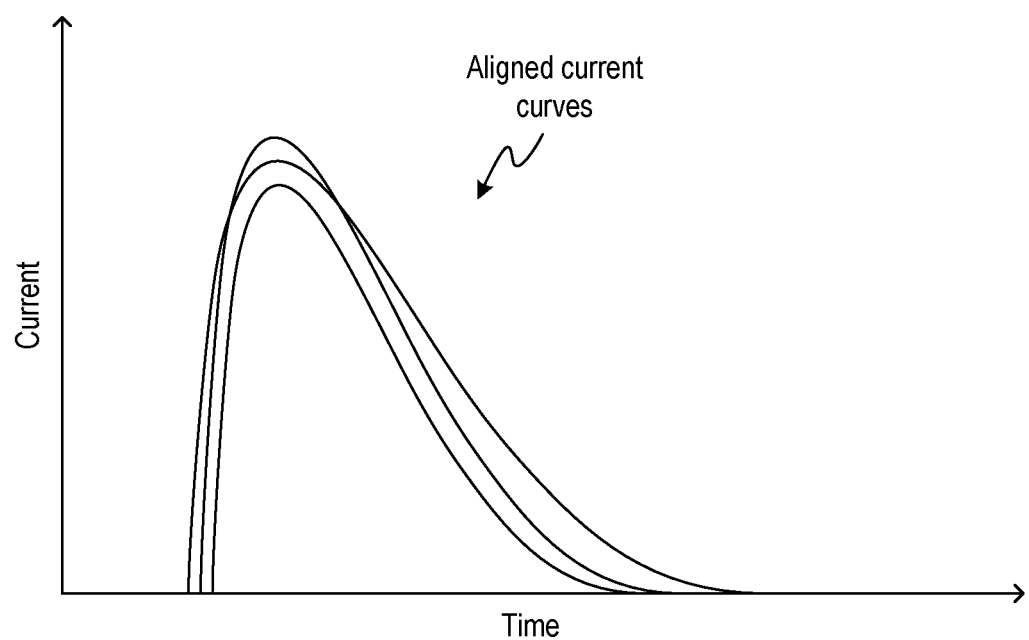

FIGS. 5A-5B illustrate how current curves can be aligned in accordance with some embodiments described herein. In FIGS. 5A-5B, the X-axis is time, and the Y-axis is current. A zero-skew alignment does not always produce the worst-case delay because the currents of the individual transistors may not peak at the same time. FIG. 5A illustrates the current curves when the different input-to-output arcs have different delays, and therefore the current curves 502, 504, and 506 of the different transistors are not aligned (i.e., these transistors do not simultaneously switch on).

In general, determining the worst-case alignment may require an iterative approach which can be computationally expensive. Some embodiments described herein do not use an iterative approach to determine the worst-case alignment. Instead, the input waveforms are shifted by their respective arc delay values (which can be obtained from the non-linear delay model (NLDM) tables for the gate) to approximate the worst-case alignment. The rationale for using the NLDM tables is to align output current peaks, which in turn minimizes the delay. Note that NLDM tables are well-known in the art, and they are used to model the delay behavior of logic gates. FIG. 5B illustrates the current-versus-time plot after the NLDM delays have been introduced in the input signals. Note that the three current curves shown in FIG. 5A are substantially aligned in FIG. 5B.

Figure 6A:
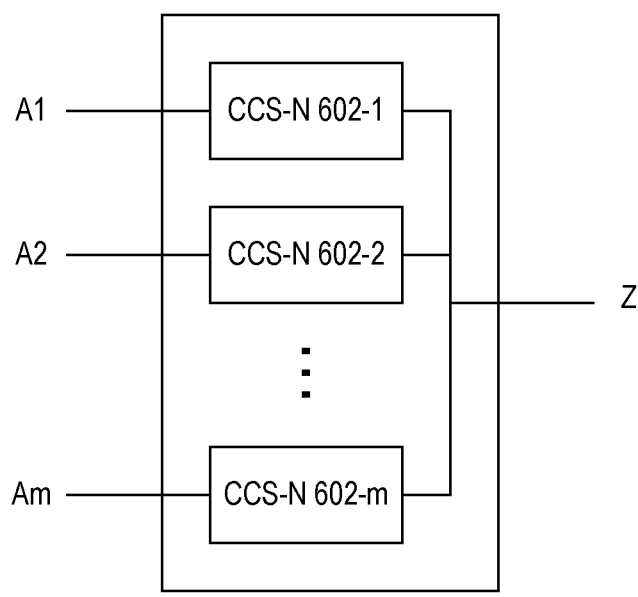
FIG. 6A illustrates a circuit comprising a set of current source models, e.g., CCS-N models, that are coupled in parallel in accordance with some embodiments described herein.

FIG. 6A illustrates a circuit comprising a set of current source models, e.g., CCS-N models, that are coupled in parallel in accordance with some embodiments described herein. The current source models, e.g., CCS-N models 602-1 through 602-m, can be determined based on solving the equations that were described above. Pins A1-Am are input pins, and pin Z is the output pin.

Figure 6B:
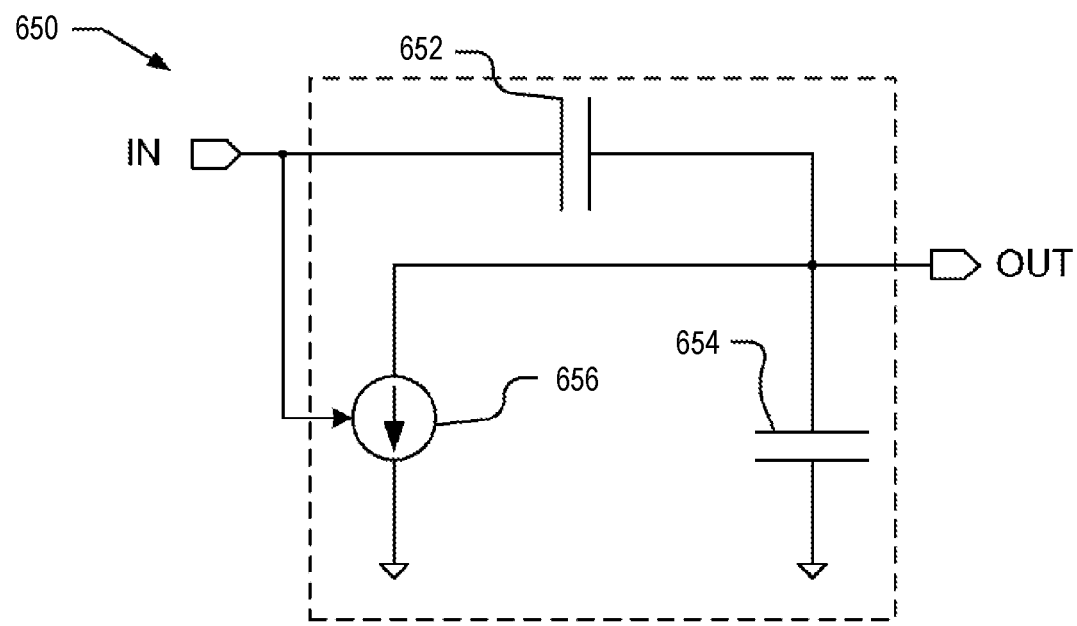
FIG. 6B illustrates a current model in accordance with some embodiments described herein.

FIG. 6B illustrates a current model in accordance with some embodiments described herein. Current model 650 is an example of a CCS-N model, and includes a Miller capacitor 652 between the input terminal IN and output terminal OUT, an output terminal capacitor 654 and a current source 656. The current of the current source 656 is a function of the cell input voltage, cell output voltage, and in some embodiments, the history of the cell current. The current history may be calculated as an integral of weighted past currents. The use of current history, input voltage, and output voltage with the current model 650 has been found to be suitable for all signal integrity analysis including, but not limited to, crosstalk delay, noise propagation, driver weakening, and combined noise propagation and noise injection. Techniques for constructing and using CCS-N models are well known in the industry, and will be evident to a person having ordinary skill in the art. Further details for constructing and using CCS-N models can be found in U.S. Pat. No. 8,478,573 entitled "Modeling Circuit Cells for Waveform Propagation," and U.S. Pat. No. 7,043,709 entitled "Method and Apparatus for Determining Gate-Level Delays in an Integrated Circuit," which are herein incorporated by reference in their entirety for all purposes.

A multi-drive simulator can be used to simulate the output waveform at the output pin of the circuit shown in FIG. 6A (which includes a set of current source models coupled in parallel) by providing a set of input waveforms to the input pins. The output of the simulator is the voltage waveform at the output pin. In some embodiments, after the set of parallel CCS-N models have been constructed, a simulator can be used to determine the minimum delay of the CMOS logic gate by simulating input waveforms with the appropriate alignment delays, and measuring a time delay between a transition in the input waveforms and a corresponding transition in the resulting output waveform. Testing results show that the accuracy of the embodiments described herein is within 3% of SPICE in most cases.

Figure 7:
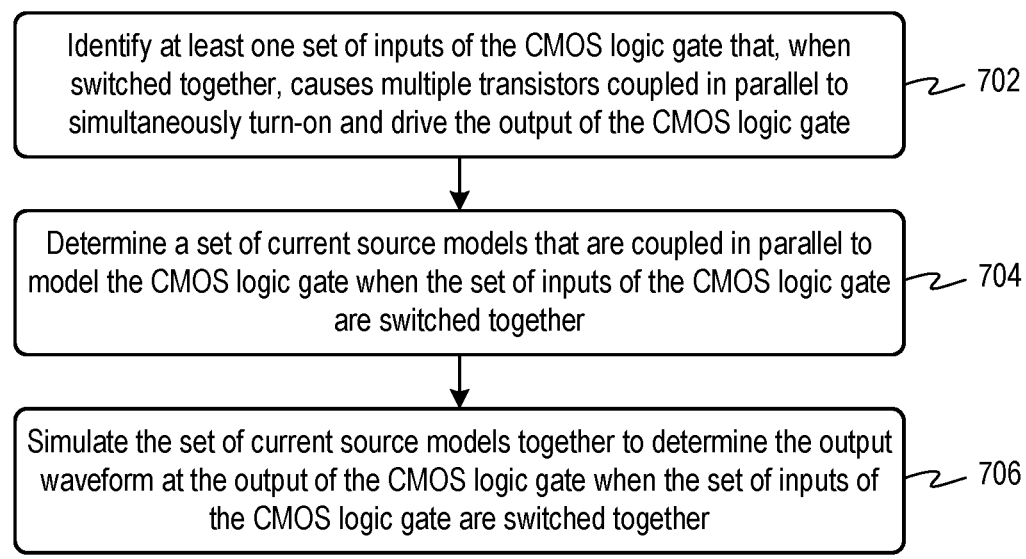
FIG. 7 illustrates a process for calculating MIS delay of a CMOS logic gate in accordance with some embodiments described herein.

FIG. 7 illustrates a process for calculating MIS delay of a CMOS logic gate in accordance with some embodiments described herein. The process can begin by identifying at least one set of inputs of the CMOS logic gate that, when switched together, causes multiple transistors coupled in parallel to simultaneously turn-on and drive the output of the CMOS logic gate (step 702). As explained above, existing NLDM tables assume that only one input switches at any given time. This means that the delay values in existing NLDM tables correspond to a single transistor (which was turned on by the single input that was switched) turning on and driving the output of the CMOS logic gate. In contrast, embodiments described here consider the case when multiple inputs are switched together (i.e., with small delay values being optionally introduced in the input waveforms to align the peaks of the driving currents of the transistors), thereby causing multiple transistors coupled in parallel to simultaneously turn-on and drive the output of the CMOS logic gate.

Next, the process can determine a set of current source models that are coupled in parallel to model the CMOS logic gate when the set of inputs of the CMOS logic gate are switched together (step 704). In some embodiments, each current source model is a ViVo current source model in which the current is a function of the input voltage and output voltage. Further details on ViVo current source models can be found in J. F. Croix and D. F. Wong, "Blade and Razor: Cell and Interconnect Delay Analysis Using Current-Based Models," DAC, pp. 386-389, 2003, the contents of which are herein incorporated by reference in their entirety for all purposes. In some embodiments, each current source model in the set of current source models is a CCS-N model. Specifically, in some embodiments, the parameters for the set of CCS-N models can be determined by solving the set of simultaneous equations as explained above.

The process can then simulate the set of current source models together to determine the output waveform at the output of the CMOS logic gate when the set of inputs of the CMOS logic gate are switched together (step 706). In some embodiments, simulating the set of current source models comprises temporally shifting input waveforms of the set of inputs to temporally align a peak driving current of the multiple transistors coupled in parallel. Specifically, in some embodiments, temporally shifting input waveforms of the set of inputs comprises temporally shifting input waveforms of each input in the set of inputs by a respective input-tooutput arc delay specified in a non-linear delay model of the CMOS logic gate. In some embodiments, the process further comprises using the output waveform to determine a delay between a transition in the set of inputs of the CMOS logic gate and a corresponding transition in the output of the CMOS logic gate. In some embodiments, the determined delay can be a maximum switching delay of the CMOS logic gate that can be used to determine a setup timing violation in an IC design that includes the CMOS logic gate. In some embodiments, the determined delay can be a minimum switching delay of the CMOS logic gate that can be used to determine a hold timing violation in an IC design that includes the CMOS logic gate.

Figure 8:
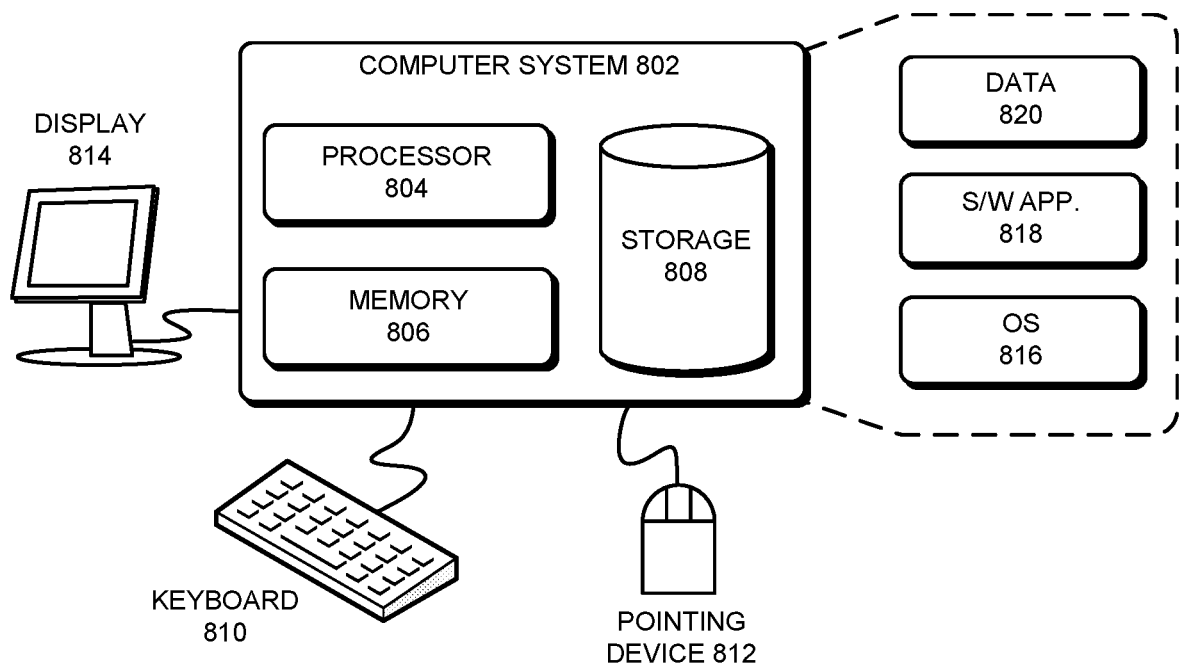
FIG. 8 illustrates a computer system in accordance with some embodiments described herein.

FIG. 8 illustrates a computer system in accordance with some embodiments described herein. The term "computer" or "computer system" generally refers to a hardware-based system that can perform computations required for the design and manufacture of ICs. Computer system 802 can include processor 804, memory 806, and storage device 808. Computer system 802 may include multiple processors, and processor 804 may include multiple cores. Specifically, memory locations in memory 806 can be addressable by processor 804, thereby enabling processor 804 to access (e.g., via load/store instructions) and manipulate (e.g., via logical/floating point/arithmetic instructions) the data stored in memory 806. Computer system 802 can be coupled to display device 814, keyboard 810, and pointing device 812. Storage device 808 can store operating system 816, software application 818, and data 820. Data 820 can include input required by software application 818 and/or output generated by software application 818.

Computer system 802 may automatically (or with user help) perform one or more operations that are implicitly or explicitly described in this disclosure. Specifically, computer system 802 can load software application 818 into memory 806, and software application 818 can then be used to accurately calculate MIS delay of CMOS logic gates. The resulting IC design is expected to have better performance and/or quality of results (QoR) because the MIS delay of CMOS logic gates was accurately calculated by using the techniques and systems described in this disclosure.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. 08.2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract' } how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable storage medium storing instructions that, when executed by a computer, cause the computer to perform a method for determining an output waveform at an output of a complementary metal-oxide-semiconductor (CMOS) logic gate, the method comprising:
    identifying at least one set of inputs of the CMOS logic gate that, when switched together, causes multiple transistors coupled in parallel to simultaneously turn-on and drive the output of the CMOS logic gate;
    determining a set of current source models that are coupled in parallel to model the CMOS logic gate when the set of inputs of the CMOS logic gate are switched together, wherein each input of the set of current source models corresponds to a respective input in the set of inputs of the CMOS logic gate; and
    simulating the set of current source models together to determine the output waveform at the output of the CMOS logic gate when the set of inputs of the CMOS logic gate are switched together.

2. The non-transitory computer-readable storage medium of claim 1, wherein said simulating the set of current source models comprises temporally shifting input waveforms of the set of inputs to temporally align a peak driving current of the multiple transistors coupled in parallel.

3. The non-transitory computer-readable storage medium of claim 2, wherein said temporally shifting input waveforms of the set of inputs comprises temporally shifting input waveforms of each input in the set of inputs by a respective input-to-output arc delay specified in a non-linear delay model of the CMOS logic gate.

4. The non-transitory computer-readable storage medium of claim 1, wherein the method further comprises using the output waveform to determine a delay between a transition in the set of inputs of the CMOS logic gate and a corresponding transition in the output of the CMOS logic gate.

5. The non-transitory computer-readable storage medium of claim 4, wherein the delay is a minimum switching delay of the CMOS logic gate.

6. The non-transitory computer-readable storage medium of claim 5, wherein the method further comprises using the minimum switching delay of the CMOS logic gate to determine a hold timing violation in an integrated circuit (IC) design that includes the CMOS logic gate.

7. An apparatus, comprising:
    a processor; and
    a non-transitory computer-readable storage medium storing instructions that, when executed by the processor, cause the apparatus to perform a method for determining an output waveform at an output of a complementary metal-oxide-semiconductor (CMOS) logic gate, the method comprising:
        identifying at least one set of inputs of the CMOS logic gate that, when switched together, causes multiple transistors coupled in parallel to simultaneously turn-on and drive the output of the CMOS logic gate, wherein each input of the set of current source models corresponds to a respective input in the set of inputs of the CMOS logic gate;
        determining a set of current source models that are coupled in parallel to model the CMOS logic gate when the set of inputs of the CMOS logic gate are switched together; and
        simulating the set of current source models together to determine the output waveform at the output of the CMOS logic gate when the set of inputs of the CMOS logic gate are switched together.

8. The apparatus of claim 7, wherein said simulating the set of current source models comprises temporally shifting input waveforms of the set of inputs to temporally align a peak driving current of the multiple transistors coupled in parallel.

9. The apparatus of claim 8, wherein said temporally shifting input waveforms of the set of inputs comprises temporally shifting input waveforms of each input in the set of inputs by a respective input-to-output arc delay specified in a non-linear delay model of the CMOS logic gate.

10. The apparatus of claim 7, wherein the method further comprises using the output waveform to determine a delay between a transition in the set of inputs of the CMOS logic gate and a corresponding transition in the output of the CMOS logic gate.

11. The apparatus of claim 10, wherein the delay is a minimum switching delay of the CMOS logic gate.

12. The apparatus of claim 11, wherein the method further comprises using the minimum switching delay of the CMOS logic gate to determine a hold timing violation in an integrated circuit (IC) design that includes the CMOS logic gate.

13. A method for determining an output waveform at an output of a complementary metal-oxide-semiconductor (CMOS) logic gate, the method comprising:
    identifying at least one set of inputs of the CMOS logic gate that, when switched together, causes multiple transistors coupled in parallel to simultaneously turn-on and drive the output of the CMOS logic gate, wherein each input of the set of current source models corresponds to a respective input in the set of inputs of the CMOS logic gate;
    determining a set of current source models that are coupled in parallel to model the CMOS logic gate when the set of inputs of the CMOS logic gate are switched together; and
    simulating, by using a computer, the set of current source models together to determine the output waveform at the output of the CMOS logic gate when the set of inputs of the CMOS logic gate are switched together.

14. The method of claim 13, wherein said simulating the set of current source models comprises temporally shifting input waveforms of the set of inputs to temporally align a peak driving current of the multiple transistors coupled in parallel.

15. The method of claim 14, wherein said temporally shifting input waveforms of the set of inputs comprises temporally shifting input waveforms of each input in the set of inputs by a respective input-to-output arc delay specified in a non-linear delay model of the CMOS logic gate.

16. The method of claim 13, wherein the method further comprises using the output waveform to determine a delay between a transition in the set of inputs of the CMOS logic gate and a corresponding transition in the output of the CMOS logic gate.

17. The method of claim 16, wherein the delay is a minimum switching delay of the CMOS logic gate.

18. The method of claim 17, wherein the method further comprises using the minimum switching delay of the CMOS logic gate to determine a hold timing violation in an integrated circuit (IC) design that includes the CMOS logic gate.

19. The method of claim 13, wherein the CMOS logic gate implements the logic function "$z=((!a_1+!a_2+\ldots+!a_m)*(!b_1+!b_2+\ldots+!b_n))$," where z is the output, $a_i$, $1 \leq i \leq m$, $b_j$, $1 \leq j \leq n$, are inputs, exclamation points represent logical negation operations, the asterisk symbol represents a logical conjunction operation, and the plus symbols represent logical disjunction operations.

20. The method of claim 13, wherein each current source model in the set of current source models is a composite current source noise (CCS-N) model.

\* \* \* \* \*